United States Patent [19]

Engeser

[11] 4,067,109
[45] Jan. 10, 1978

[54] DUMMY HEAD FOR USE IN TEACHING DENTISTRY

[75] Inventor: Rudolf Engeser, Biberach, Germany

[73] Assignee: Kaltenbach & Voigt, Biberach an der Riss, Germany

[21] Appl. No.: 703,504

[22] Filed: July 8, 1976

[30] Foreign Application Priority Data

July 14, 1975 Germany .............................. 2531437

[51] Int. Cl.² ............................................. A61C 19/00
[52] U.S. Cl. ....................................................... 32/71
[58] Field of Search ............... 32/71, 15, 40 R; 35/17, 35/20

[56] References Cited

U.S. PATENT DOCUMENTS 2,203,891  6/1940  Burtenshiw .............................. 32/71

Primary Examiner—Robert Peshock
Attorney, Agent, or Firm—Haseltine, Lake & Waters

[57] ABSTRACT

A dummy head has a skull or crown, and a jaw portion having upper and lower jaws. Each jaw has a denture, and the jaws are arranged to define a cavity simulating a human oral cavity, and a mouth aperture. The jaw portion is of unitary construction, and is releasably connected to the skull or crown.

12 Claims, 5 Drawing Figures

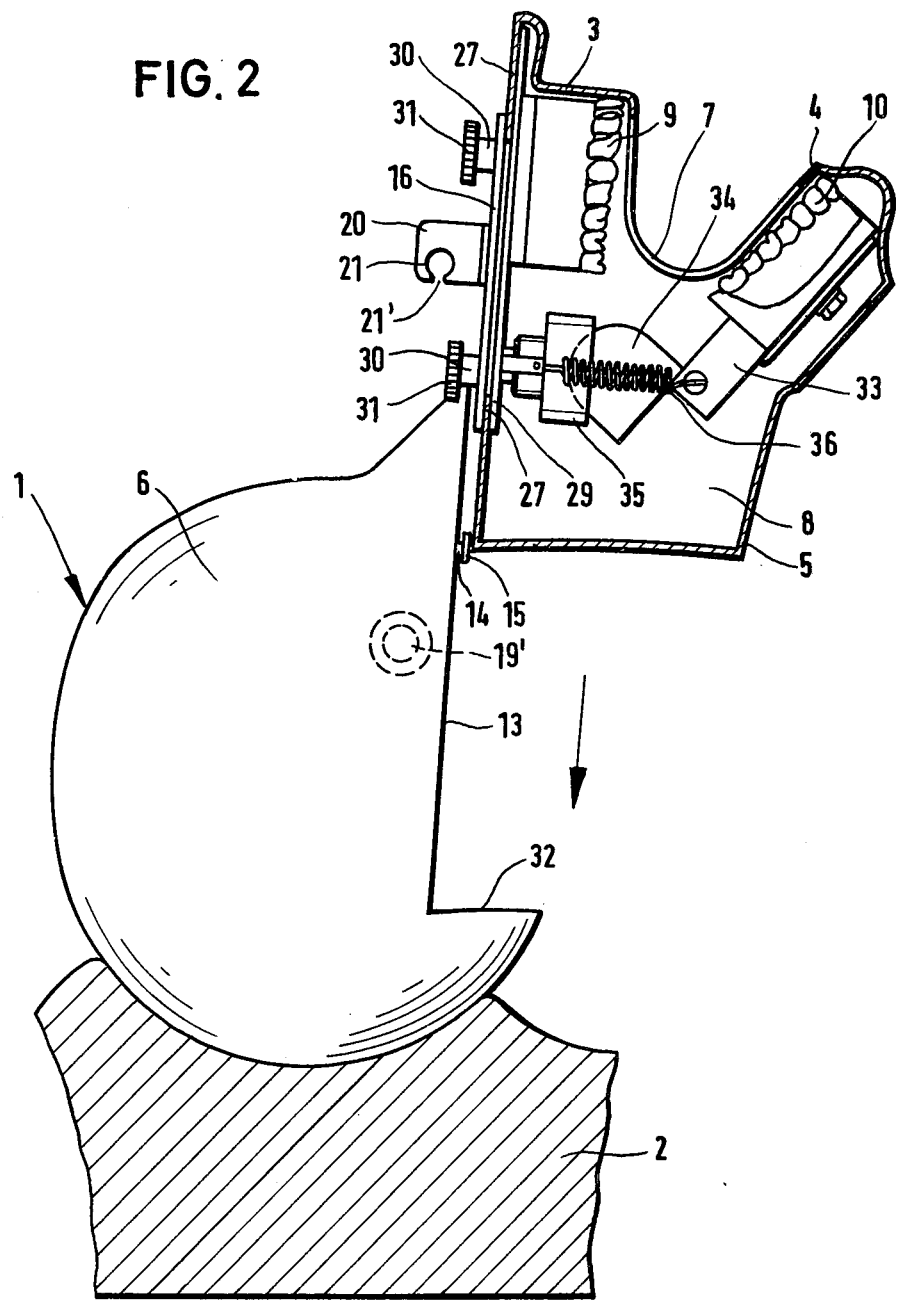

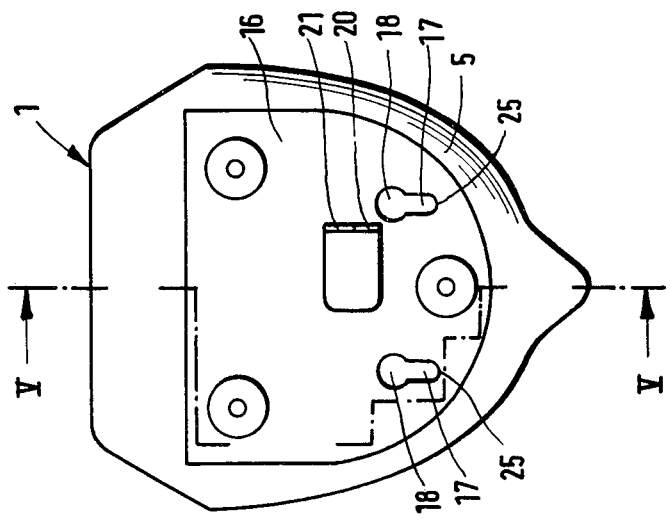
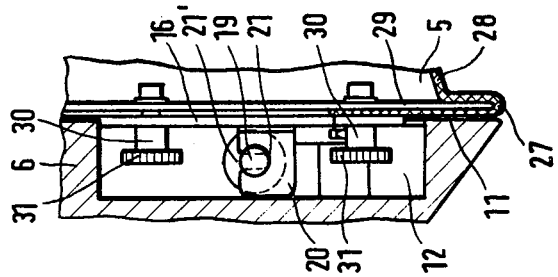
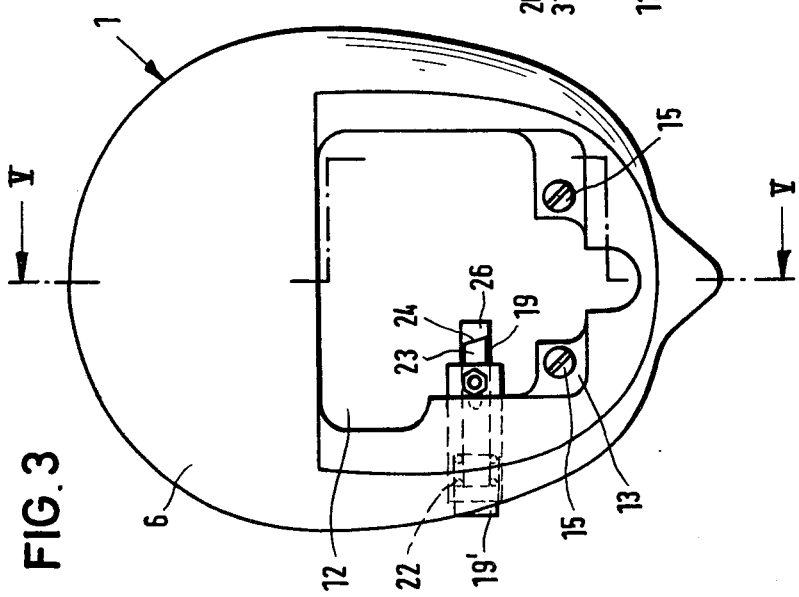

DUMMY HEAD FOR USE IN TEACHING DENTISTRY

This invention relates to a dummy head for use in teaching dentistry and having an upper and a lower jaw arranged in a cavity simulating the cavity of a human mouth and having a mouth aperture, each jaw having a respective denture on which practice dental operations can be carried out.

It is known from German Offenlegungsschrift No. 2,053,255 to provide a dummy head which is adjustably supported in a holding device, so as to be able to simulate the various positions of a human head occurring during treatment of teeth. It is the purpose of devices of this type to make it possible for the student or learner to learn, on the denture inserted in the dummy head, those methods of treating the teeth which he will later encounter during his activity as a dentist. During such procedure, drilling and grinding dust and other contaminating elements enter the cavity simulating the human oral cavity. Simple and rapid cleansing of the cavity and of the denture arranged therein, for example by washing or rinsing with water, has hitherto proved impossible. On the contrary, hitherto it has been necessary, in inconvenient manner, to release the entire head, with its mounting means secured thereon, from the holding device. Due to the size of the head which, in respect of its shape and dimensions, corresponds to a human head, it is difficult to put the unwieldy head under water. In many cases, it is conventional to provide the head with a waste pipe for removing spray and syringe water which has reached into the cavity during a practice treatment, and for this reason in these cases it is additionally necessary to remove the waste pipe in somewhat tedious manner prior to washing or rinsing, and subsequently to reconnect it. On restoring the mounting of the cleaned head on the holding device, it was difficult to once again achieve or to readjust the previously adopted "treatment position".

It is an object of the invention to provide a dummy head for use in teaching dentistry, wherein simple and rapid cleaning of the cavity simulating the human oral cavity is facilitated.

According to the invention there is provided a dummy head for use in teaching dentistry and comprising;
a skull portion;
a jaw portion;
upper and lower jaws provided in said jaw portion and arranged to define a mouth aperture;
and a respective denture arranged in each of said jaws;
wherein said jaw portion is of unitary construction and is releasably connected to said skull portion.

The jaw portion of unitary construction constitutes — since it delimits only the cavity simulating the human oral cavity — a small portion of the dummy head which, subsequent to release from the skull portion, can readily be manipulated and the interior of which can, with the mouth aperture open, be cleaned in simple manner, for example in a rinsing bowl by rinsing or washing under water. Since the jaw portion is — save for the mouth aperture — fluid-tight, the cavity simulating the human oral cavity does not require to have a waste pipe or waste line associated with it. This has the further advantage that during the work on the dummy head, to simulate the conditions when treating a human denture, the liquid passing into the cavity is able to accumulate and can be removed by suction with the aid of a conventional saliva suction means or other instrument for suctional removal. Due to the fact that there is no waste pipe, release and connecting of the jaw portion with respect to the skull portion of the dummy head becomes still simpler.

Additionally, the releasable jaw portion affords the advantage that, for example if a study or teaching place is occupied more than once, it will be unnecessary for a student following a student who previously had worked there, to change the entire dummy head, but only to interchange the jaw portion with a replacement jaw portion having the denture intended for the particular student. Additionally, the jaw portion (constituting a light and "handy" pocket-form member) subsequent to release from the skull portion, can be conveniently shown to the teacher (for example by holding-up) and, on the other hand, also displayed by the teacher. Finally, the small pocket-form member can be stored in space-saving manner in a relatively small drawer or in a pidgeon-hole, this being impossible with the entire dummy head.

It is known individually to secure an upper jaw and a lower jaw to a dummy head with the aid of screws. By releasing the screws, the upper and lower jaws can be removed and for example replaced. However, cleaning of the cavity of the known dummy head simulating the human oral cavity is not thereby facilitated.

German Utility Model No. 74 37 934 discloses a side elevation of a two-dimensional model of a human head for dental demonstrations, wherein the model is subdivided along a parting line extending in prolongation of the mouth aperture. Due to mutual displacement of the two model elements constituted by the subdivision, along the parting line, it is possible to demonstrate varying denture positions. In this case, the problem of cleaning does not arise, especially since the model has no oral cavities and no tooth treatment work is simulated on the model.

It is preferred that the skull portion and the jaw portion have a substantially planar parting line between the upper jaw and the skull portion and extending parallel to the upper jaw. Thereby, the re-attachment of the jaw portion to the skull portion is facilitated.

For this purpose, the jaw portion and the skull portion of the dummy head may be provided with latching elements adapted to be put into mutual engagement.

The latching elements may comprise headed latching pins arranged on one of the portions of the dummy head, and keyhole apertures formed in the other portion of the dummy head.

In order that the dummy head may not have disturbing outer protuberances or the like, constituted by the latching elements, it is preferred that the latching elements shall be arranged on the abutting faces of the jaw portion and the skull portion and in the plane of the parting line.

For securing the releasable connection between the jaw portion and the skull portion of the dummy head, it is expedient if the latching elements comprise a locking pin arranged on one of the portions, and a detent aperture provided on the other of the portions. With this arrangement, the locking pin can be displaceable, against the action of a spring, out of its locking position and can be actuated from the exterior of the head, and can also, where required, extend in a plane parallel to the plane of the parting line.

Expediently, the jaw portion comprises a rigid base and a "pocket" of flexible material secured at its edge to the base face. The jaw portion can, in this case, readily be put into abutment with the rigid base face against a corresponding face on the skull portion of the dummy head, and can be latched in that position. Thereby, the base constitutes the face of the jaw portion passing into abutment at the corresponding face of the skull portion of the dummy head.

For further facilitating establishment of the releasable connection between the jaw portion and the skull portion of the dummy head, it is expedient if there is provided on the skull portion a stop for the base face to be applied from the side.

BRIEF DESCRIPTION OF THE DRAWINGS

FIG. 2 is a schematic illustration of the dummy head, with the jaw portion shown in section and released from connection with the skull portion;

FIG. 3 is an end view of the skull portion;

FIG. 4 is an end view of the jaw portion; and

FIG. 5 is a sectional view taken on the line V—V in FIGS. 3 and 4.

DESCRIPTION OF THE PREFERRED EMBODIMENT

Figure 1:
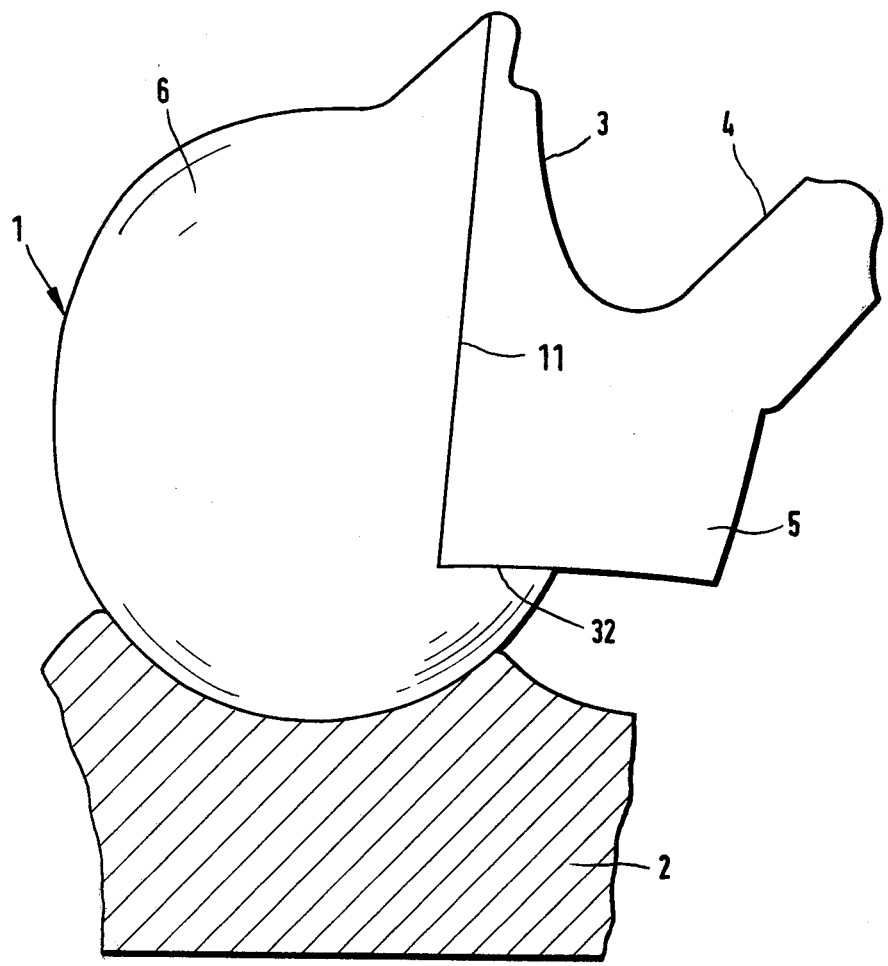
FIG. 1 is a side view of a dummy head mounted in a holding device, comprising a skull portion and a jaw portion releasably connected together.

The dummy head, generally designated 1, is mounted on a holding device 2 designed as a support component. The mounting can be effected by simple supporting of the rear portion of the head 1 (curved to form part of the surface of a sphere) in the holding device 2 which is of socket-like design. The head 1 can, however, also be secured in any desired mounting position for example by screws at the holding device 2.

The head 1 comprises two elements, i.e. a pocket-form member 5, constituting a jaw portion of the head 1, and simulating an upper jaw 3 and a lower jaw 4, and a remaining portion 6 releasably connected therewith, portion 6 constituting a skull or crown portion of head 1. The pocket-form member 5 is of unitary construction and delimits a cavity 8 which simulates the human oral cavity and is formed with a mouth aperture 7, and in which there is arranged dentures 9 and 10 on jaws 3 and 4 respectively. As will be apparent from FIGS. 1 and 2, the head 1 is mounted with its portion 6 on the holding device 2. Provided between the pocket-form member 5 and the portion 6 of the head 1 is a substantially plane parting line or gap 11 which, according to FIG. 5, is formed with a recess 12 in the remaining portion 6 for receiving latching elements and securing means (described hereinbelow).

The above-mentioned latching elements comprise, according to FIGS. 3 and 4, headed latch pins 14 arranged at the face 13 facing the parting gap 11 of the remaining portion 6 of the head 1, and having widened slotted heads 15, and keyhole apertures comprising slots 17 formed in a rigid base face 16 of the pocket-form member 5 and extending parallel to each other, and which are each formed at one end with an inlet aperture 18 widened for introducing the respective head 15. The push-in pins 14, with the widened heads 15 engaging rearwardly of the longitudinal edges of the slots 17, and the slots 17, constitute guide means affording a bayonet-type engagement.

In addition to the latching elements, there are locking elements comprising a locking pin 19 axially displaceable in the remaining portion 6 of the head 1 but mounted to be non-rotatable, and a detent aperture 2 formed in an extension bracket 20 constituted by an angle member and arranged on the rigid base face 16 of the pocket-form member 5, for receiving the locking pin 19. The locking pin 19 and the detent aperture 21 constitute securing means for the releasable connection of the pocket-form member 5 and the remaining portion 6.

The locking pin 19 extends transversely of the longitudinal extent of the slots 17 and parallel to the parting gap 11. It can be actuated from the exterior by finger pressure on its thickened end 19' and displaced, against the action of a compression spring 22, out of its locking position, i.e. out of the position wherein it is snapped into the detent aperture 21. For the "out of closure" or unlocking position, the locking pin 19 has a flattened section 23 (flatly rectangular in cross-section) having an obliquely extending delimiting edge 24. Pin 19 also has a portion 26, which is less deep than section 23, but which is cylindrical in shape. The latter makes it possible for the pin 19 to snap automatically into mouth 21' of detent apertures 21 when the member 5 is displaced downwardly (after the heads 15 of pins 14 have been introduced through apertures 18) so that the shanks of pins 14 are received in the ends 25 of slots 17. In the snapped-in position, a non-flattened portion 26 of pin 19 is received in the detent aperture 21. Depression of end 19' of pin 19 will enable the detent aperture 21 to be raised out of locking engagement with pin 19. As shown in FIG. 2, a stop 32 is provided by skull portion 6 in order to limit the downward movement of member 5.

In FIG. 2, the skull portion 6 and jaw portion or pocket-form member 5 are shown schematically in a released position. In order to connect together portions 5 and 6 (by means of the above described latching and locking elements), it will be necessary first to move the portion 5, from the illustrated position, downwardly and laterally away from portion 6, to a position in which the heads 15 of pins 14 are substantially in vertical registry with apertures 18. The portion 5 may then be displaced horizontally whereby the heads 15 pass through apertures 18, and the heads 31 of clamping screws 30 and the bracket 20 can be received in recess 12. Thereafter, further downward movement takes place of portion 5 so that pins 14 are received at the ends 25 of the slots 17 to complete the latching together of portions 5 and 6, and detent aperture 21 moves over locking pin 19 to complete the locking together of portions 5 and 6.

According to FIGS. 2 and 5, the pocket-form member 5 comprises the already mentioned rigid base face 16 and a pocket 28 made from flexible material and secured at its edge 27 to the base face 16. The rigid base face 16 carries a clamping plate 29, the edge 27 of the pocket 28 being disposed between the base face 16 and the clamping plate 29. By means of clamping screws 30, the edge 27 is secured between face 16 and the clamping plate 29. The heads 31 of the clamping screws 30, the locking pin 19, and also the associated extension 20 formed with the detent aperture 21 (FIG. 5), project into the recess 12.

Referring to FIG. 2, the upper jaw 9 is rigidly secured in the pocket-form member 5, for example at the clamping plate 29. The lower jaw 10 is secured to a holder 33 having at its rear end a substantially hemispherical bearing element 34. The bearing element 34 is mounted in a ring 35 secured in the pocket-form member 5 and serving as a socket. The bearing element 34 is retained in the ring 35 by a traction spring 36 engaging at the end of the holder. In this manner, the lower jaw 10 can be pivoted and rotated relative to the upper jaw 9, the traction spring 36 retaining the lower jaw 10 in the particular position set in each particular instance.

I claim:

1. A dummy head for use in teaching dentistry and comprising;
   a skull portion;
   a jaw portion;
   said skull and jaw portions respectively cooperating to form said dummy head;
   upper and lower jaws provided in said jaw portion and arranged to define a mouth aperture;
   dentures arranged in each of said upper and lower jaws, respectively;
   wherein: said jaw portion containing said dentures is of unitary construction and is releasably connected to said skull portion for detachment therefrom to permit separation of the jaw from the skull portion.

2. A dummy head according to claim 1, wherein the skull portion is mounted in a holder.

3. A dummy head according to claim 1, including a parting line separating said jaw portion from said skull portion, said parting line being located intermediate said upper jaw and said skull portion, and extending generally parallel to said upper jaw.

4. A dummy head according to claim 1, including mutually interengageable latches provided in said skull portion and said jaw portion for connecting the jaw portion releasably to the skull portion.

5. A dummy head according to claim 4, wherein said latches comprise a headed latch pin provided in one of said portions and having a shank and a head at one end of the shank, and a keyhole aperture provided in the other of said portions and comprising a slot and an enlarged opening at one end of said slot, the head of the latch pin being receivable through said opening and the shank of the latch pin being thereafter moveable along said slot in order to latch the jaw portion to the skull portion.

6. A dummy head according to claim 4, including mutually abutting faces provided on said skull portion and said jaw portion, wherein said latches are provided on said faces.

7. A dummy head according to claim 1, including mutually interengageable locking elements provided in said skull portion and said jaw portion, wherein said locking elements comprise a locking pin provided in one of said portions and a detent aperture provided in the other of said portions.

8. A dummy head according to claim 7, wherein said locking pin is actuatable from externally of the head for displacement from a locking position to an unlocking position, including means biasing the locking pin to said locking position.

9. A dummy head according to claim 8, wherein said locking pin is displaceable in a plane parallel to an engagement plane separating the skull portion and the jaw portion.

10. A dummy head according to claim 1, wherein said jaw portion comprises a rigid base, and a pocket of flexible material having an edge secured to said base.

11. A dummy head according to claim 10, wherein said skull portion has an engagement face engaging said rigid base of the jaw portion.

12. A dummy head according to claim 11, wherein said rigid base and said engagement face are relatively displaceable, including a stop on said skull portion for limiting said relative displacement in one direction.

* * * * *